United States Patent Office 3,218,198
Patented Nov. 16, 1965

3,218,198
FILLING AND VENTING CONSTRUCTION FOR AN ELECTRIC STORAGE BATTERY
Howard T. Havlick, Willoughby, Ohio, assignor, by mesne assignments, to The Electric Storage Battery Company, a corporation of New Jersey
Filed Aug. 14, 1963, Ser. No. 302,157
7 Claims. (Cl. 136—177)

This invention relates to a filling and venting construction for an electric storage battery, and in particular, it relates to a battery cover construction which provides for the venting of a plurality of cells and the safety filling of a plurality of cells by a single addition of electrolyte or water.

In the electric storage battery art, battery covers are generally provided with filling openings for each cell which openings are closed during the operation of the battery by removable, vented plugs. In order to fill the battery with electrolyte or to replenish water lost from the electrolyte, it is necessary to fill each cell individually often resulting in over-filling one or more cells. It is obviously inconvenient and dangerous to have to remove vented plugs from each cell, separately fill each cell and replace the vented plugs.

It is one of the objects of this invention to provide an improved battery cover construction which enables one to fill a plurality of electric storage battery cells with electrolyte or waetr in a single filling operation.

Another object of the invention is to provide a battery cover construction which eliminates the necessity for removable, vented plugs for each cell of the battery.

A further object of the invention is to provide a battery cover construction which enables a plurality of battery cells to be safety filled with electrolyte or water in a single filling operation.

Figure 1:
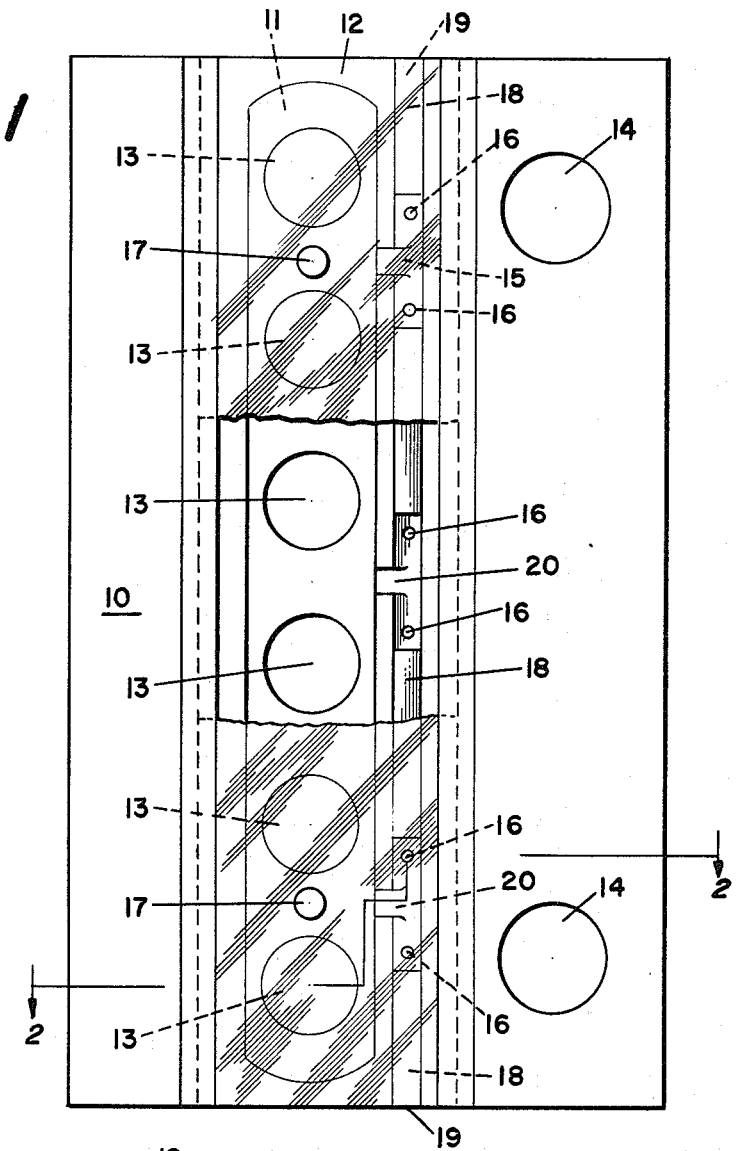
Figure 2:
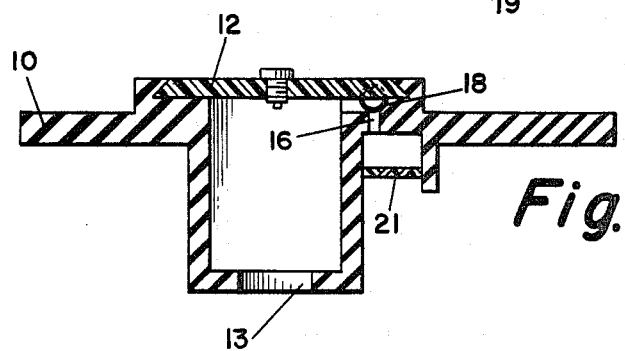

Other objects and advantages of this invention will be apparent to those skilled in the art in view of the following description, and in particular, by reference to the drawings in which:

FIGURE 1 is a top plan view of a battery cover for a 6 cell battery made in accordance with this invention with a portion of the sliding cover broken away, and FIGURE 2 is a section taken on line 2—2 of FIGURE 1.

It has been discovered that an improved electric storage battery cover design may be provided which permits the safety filling of a plurality of cells in a single filling operation. The term "safety filling" means that as the electrolyte or water which is being introduced into the cells reaches the desired level, air trapped in ecah cell creates an air lock which prevents further electrolyte or water from entering the cell, and a small volume of excess electrolyte or water merely collects in a recessed filling trough which surrounds the cell filling wells. This excess liquid is then equally divided among the cells when the air lock is released. In addition, the battery cover design of this invention provides a one piece, transparent sliding cover for closing the cell filling wells which eliminates the necessity for a vented plug or cap for each cell.

In accordance with this invention, there is provided a battery cover having a recessed filling trough which surrounds filling wells leading into each cell in such manner that a liquid introduced into the filling trough will have access to each cell. Each cell has a vent opening in the battery cover which openings are aligned in a channel near the filling trough and running substantially parallel to the filling trough. A transparent sliding cover is positioned over the filling trough and the channel in which the vent openings are inserted. The sliding cover should be transparent so that the electrolyte level in each cell and in the filling trough is visible. The sliding cover is substantially as long as the battery cover and of sufficient width to completely cover both the filling trough and the channel containing the cell vents.

One of the principal features of this invention is that there is attached to the underside of the sliding cover and positioned to ride in the channel containing the vent openings, a plurality of pieces of resilient, electrolyte resistant material, e.g., a natural or synthetic resin or elastomer. These resilient pieces are attached to the sliding cover in such a manner that when the cover is partially slid from the top of the battery cover and a portion of the filling trough is exposed to the atmosphere, they are positioned over all of the cell vent openings in the channel so as to form a positive seal for all of the cell vents, but when the sliding cover is in position to completely cover the filling trough, the cell vent openings are not covered by the resilient material. When the filling trough is exposed to the atmosphere, which may be termed the "filling" position, the resilient material provides a positive seal for all of the cell vents, and as electrolyte or water is introduced into the portion of the filling trough which is exposed to the atmosphere, an air lock is developed in each cell which provides for the safety filling feature of this invention.

In one embodiment of this invention, the resilient material may be in the form of a hollow tube which provides a vent to the atmosphere when the sliding cover is in "operating" position and the cell vent openings are not covered by the pieces of hollow tubing. An additional feature which may be incorporated into the design of battery covers in accordance with this invention is the provision of one or more vent passages conecting the filling trough and the channel. Such a vent passage acts as an additional vent for evolved gases if one or more venting means is provided in the sliding cover over the filling trough, and it permits any condensed water which might collect in the channel to run back into the filling trough. The battery may be vented to the atmosphere either through the resilient hollow tubing or through venting means in the sliding cover, or both of these venting methods can be used in combination. One convenient method for venting the battery through the sliding cover is to provide one or two cover stops in the form of small vent plugs which may be screwed into the sliding cover so as to project into the filling trough, and which serve the dual function of venting the battery and also preventing the removal of the sliding cover. The cover stops also help to position the sliding cover in the "fill" position by stopping its removal when the cell vents are covered.

A more complete and detailed description of a battery cover in accordance with this invention will now be presented by referring to the drawings which illustrate a preferred embodiment of this invention.

FIGURE 1 illustrates a battery cover 10 as viewed from the top of the cover in which there is a recessed filling trough 11 covered by a sliding cover 12. This particular battery cover is to be used on a 6-cell battery. The battery cover may be prepared from a hard rubber composition and the sliding cover 12 is prepared from a transparent, rigid, electrolyte resistant plastic. In the bottom of the filling trough there are 6 filling wells 13 which are open and lead into each of the cells. In two corners of the battery cover there are openings 14 through which the battery terminals project.

Separate from and running substantially parallel to filling trough, there is a channel 15 and aligned within the channel are vent openings 16 leading to each cell. The vent openings form gas passages through which gases evolved in the cells can escape to the atmosphere. The sliding cover 12 is of sufficient width to completely cover both the filling trough 11 and the channel 15. The sliding cover 12 contains two stoppers 17 which may be screwed into the cover so as to project into the filling trough and which prevent its removal by engaging the end of the filling trough 11. It is preferred that the stoppers abut the end of the filling trough when the vents 16 are covered and the sliding cover is in "fill" position. It should be noted that the sliding cover 12 is in the position illustrated in FIGURE 1 during the operation of the battery for the wells 13 and trough 11 are closed by the cover 12 and gases evolved in the cells can escape to the atmosphere through the vents 16 and the resilient hollow tubing 18. If desired, the stoppers 17 may be small vent plugs which also vent the battery.

Permanently attached to the underside of the sliding cover 12 and positioned so as to ride in the channel 15 are a plurality of pieces of resilient, electrolyte resistant material 18. The pieces of resilient material 18 are attached to the sliding cover 12 in such a manner that when the sliding cover is partially slid from the top of the battery cover and a portion of the filling trough 11 is exposed to the atmosphere for filling, the pieces of resilient material 18 are positioned over all of the cell vent openings 16. In this manner, all of the cell vents are sealed and as water or electrolyte is introduced into the filling trough, an air lock is developed in each cell. When each cell is filled with the desired amount of electrolyte plus entrapped air, this will be indicated by the excess of electrolyte or water which will remain in the filling trough as viewed through the transparent sliding cover. This excess electrolyte will divide equally among the cells when the air lock is released and an extra volume of electrolyte should be considered when designing the air lock.

As shown in FIGURES 1 and 2, the resilient material 18 is in the form of a hollow tube which provides vents 19 to the atmosphere. Neoprene is a suitable material for forming the resilient pieces 18 though other synthetic or natural polymers may be used. If desired, vent passages 20 connecting the filling trough 11 and the channel 15 may also be provided, and must be provided if the battery is to be vented through stoppers 17. As shown in FIGURES 1 and 2, the sliding cover 12 may be slid in either of two directions completely out of the battery cover in the absence of stoppers 17. In the event that the resilient material 18 is not hollow to permit the escape of gases, the battery may be vented to the atmosphere through vents 16, vent passages 20 and stoppers 17 or other venting means in the sliding cover.

In addition, a baffle 21 as shown in FIGURE 2 should be positioned below each vent opening 16 to prevent escape of electrolyte through the vent openings.

Modifications and alterations of the battery cover design of this invention will naturally occur to those skilled in the art and are intended to be included within the scope of this invention.

Having completely described this invention what is claimed is:

1. An electric storage battery cover for a battery having a plurality of cells comprising a battery cover having a recessed filling trough with a filling well for each cell located in the bottom of said filling trough, a channel separate from and running substantially parallel to the filling trough with vent openings for each cell aligned in said channel, venting passages connecting the filling trough and the cell vents in the channel, a transparent sliding cover of sufficient length and width and positioned in the battery cover so as to completely cover both the filling trough and the channel, said sliding cover containing venting means so as to enable gases evolved in each cell to escape into the atmosphere, and permanently attached to the underside of said sliding cover and positioned to ride in said channel a plurality of pieces of resilient electrolyte resistant material which are attached to the sliding cover in such a manner that when the cover is partially slid from the top of the battery cover exposing a portion of the filling trough to the atmosphere, said pieces of resilient material are positioned over all of the cell vent openings in the channel so as to form a positive seal for all of the cell vents, but when the sliding cover is in position to completely cover the filling trough, the cell vent openings are not covered by the resilient material.

2. A battery cover in accordance with claim 1 in which there is at least one stopper attached to said sliding cover and projecting into the filling trough which limits the distance through which said sliding cover may be slid.

3. A battery cover in accordance with claim 2 in which each stopper is a vent plug and thereby serves as the venting means over the filling trough.

4. A battery cover in accordance with claim 3 in which the resilient, electrolyte resistant pieces are in the form of hollow tubes which also serve as a venting means.

5. An electric storage battery cover for a battery having a plurality of cells comprising a battery cover having a recessed filling trough with a filling well for each cell located in the bottom of said filling trough, a channel separate from and running substantially parallel to the filling trough with vent openings for each cell aligned in said channel, a transparent sliding cover of sufficient length and width and positioned in the battery cover so as to completely cover both the filling trough and the channel, said sliding cover having permanently attached to its underside and positioned to ride in said channel a plurality of pieces of resilient, electrolyte resistant hollow tubing which function as venting means to the atmosphere, said pieces of tubing being positioned in such a manner that when the cover is partially slid from the top of the battery cover exposing a portion of the filling trough to the atmosphere, said pieces of resilient hollow tubing are positioned over all of the cell vent openings in the channel so as to form a positive seal for all of the cell vents, but when the sliding cover is in position to completely cover the filling trough, the cell vent openings are not covered by the resilient hollow tubing.

6. A battery cover in accordance with claim 5 in which there is at least one venting passage connecting the filling trough and the channel.

7. A battery cover in accordance with claim 6 in which there is at least one stopper attached to said sliding cover and projecting into the filling trough which limits the distance through which said sliding cover may be slid.

References Cited by the Examiner

UNITED STATES PATENTS

| | | | |
|---|---|---|---|
| 1,269,096 | 6/1918 | Land | 136—170 |
| 2,697,129 | 12/1954 | Shannon | 136—170 |
| 3,161,548 | 12/1964 | Goldingay | 136—170 |

WINSTON A. DOUGLAS, *Primary Examiner.*

D. L. WALTON, *Examiner.*